US011964476B2

(12) United States Patent
Tomatsu et al.

(10) Patent No.: US 11,964,476 B2
(45) Date of Patent: Apr. 23, 2024

(54) PRINT DEVICE AND CONVEYANCE DEVICE WITH TENSIONER

(71) Applicant: BROTHER KOGYO KABUSHIKI KAISHA, Nagoya (JP)

(72) Inventors: Yoshiya Tomatsu, Nagoya (JP); Mitsugi Tanaka, Ichinomiya (JP); Yoji Tsujishita, Nagoya (JP); Masayuki Okumura, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/844,299

(22) Filed: Jun. 20, 2022

(65) Prior Publication Data

US 2022/0402284 A1 Dec. 22, 2022

(30) Foreign Application Priority Data

Jun. 22, 2021 (JP) ................................ 2021-103261

(51) Int. Cl.
*B41J 15/16* (2006.01)
*B65H 23/16* (2006.01)
*B65H 23/32* (2006.01)

(52) U.S. Cl.
CPC .............. *B41J 15/16* (2013.01); *B65H 23/16* (2013.01); *B65H 23/32* (2013.01); *B65H 2801/12* (2013.01)

(58) Field of Classification Search
CPC ...... B41J 15/16; B65H 2801/12; B65H 23/16; B65H 23/32
See application file for complete search history.

(56) References Cited

U.S. PATENT DOCUMENTS

2005/0018029 A1* 1/2005 Takagi .................. B41J 15/048 347/104
2009/0255971 A1* 10/2009 Nakamaki ............... B41J 11/42 226/1
2015/0054898 A1 2/2015 Kondo et al.
2015/0175374 A1 6/2015 Horaguchi
2015/0183599 A1* 7/2015 Suganuma ........... B65H 3/0684 271/264

FOREIGN PATENT DOCUMENTS

JP 2000-191194 A 7/2000
JP 2011-143997 A 7/2011
JP 2014-176973 A 9/2014
JP 2015-39775 A 3/2015
JP 2015-117125 A 6/2015

* cited by examiner

*Primary Examiner* — Henok D Legesse
(74) *Attorney, Agent, or Firm* — Kenealy Vaidya LLP

(57) ABSTRACT

A print device includes a supply unit, a print unit, a conveyer, a tensioner, and a rotor. The conveyer is configured to nip and to convey, with a pair of rollers, a long medium in a conveyance direction. The tensioner is configured to contact a second surface of the medium to cause the medium to bend. The tensioner is pivotably supported at a position upstream of the conveyer in the conveyance direction. The rotor is rotatably supported at a position upstream of the conveyer in the conveyance direction, and positioned downstream, in the conveyance direction, of an upstream end portion, in the conveyance direction, of the tensioner. The rotor is positioned such that an upper end of the rotor and a nipped point are at a same height. The rotor is configured to contact the second surface.

12 Claims, 6 Drawing Sheets

PRINT DEVICE AND CONVEYANCE DEVICE WITH TENSIONER

CROSS REFERENCE TO RELATED APPLICATIONS

This application claims priority to Japanese Patent Application No. 2021-103261 filed Jun. 22, 2021, the content of which is hereby incorporated herein by reference in its entirety.

BACKGROUND

The present disclosure relates to a print device and a conveyance device.

A conventional print device is provided with a pair of rollers, one being a conveyance roller and the other being an opposing roller, a first guide roller, a second guide roller, and a spring. The pair of rollers, i.e., the conveyance roller and the opposing roller, sandwich and apply pressure to a medium. A long medium is pulled out from a roll, and goes between the conveyance roller and the opposing roller. The first guide roller and the second guide roller are disposed between the roll and the conveyance roller. The second guide roller is an assist rotor, and is disposed downstream of the first guide roller in the conveyance direction of the medium. The spring applies tension to the medium by pressing the second guide roller downward. The medium bends along an outer peripheral surface of the second guide roller, and receives the tension from the second guide roller.

SUMMARY

In the print device, the tension applied to the medium from the second guide roller is lost due to the friction load between the medium and the second guide roller. In this way, with the print device, the tension applied to the medium from the second guide roller ends up being off from the intended tension due to the friction load at the bent portion of the medium, which is problematic.

Embodiments of the broad principles derived herein provide a print device and a conveyance device in which a loss of tension applied to a medium, due to a friction load at a bent portion of the medium, is less than in the past.

Embodiments provide a print device that includes a supply unit, a print unit, a conveyer, a tensioner, and a rotor. The supply unit is configured to supply a long medium. The print unit is configured to print an image on a first surface of the medium fed out from the supply unit. The print unit is disposed above the supply unit. The conveyer has a pair of rollers rotating around an axis extending in an axial direction. The conveyer is configured to nip and to convey, with the pair of rollers, the medium in a conveyance direction from the supply unit toward the print unit. The conveyer is positioned upstream of the print unit in the conveyance direction. The tensioner is configured to contact a second surface of the medium on a side opposite the first surface of the medium to cause the medium to bend, and to apply tension to the medium. The tensioner is disposed above the supply unit, and is pivotably supported around an axis extending in the axial direction, at a position upstream of the conveyer in the conveyance direction. The rotor is rotatably supported around an axis extending in the axial direction. The rotor is positioned upstream of the conveyer in the conveyance direction, and positioned downstream, in the conveyance direction, of an upstream end portion in the conveyance direction of the tensioner. The rotor is positioned such that an upper end of the rotor and a nipped point where the medium is to be sandwiched between the pair of rollers are at a same height. The rotor is configured to contact the second surface of the medium. The print device is configured to receive, with the rotor, part of a bent portion where the medium that reaches the conveyer from the supply unit bends. Rolling friction is generally smaller than sliding friction. Therefore, the rotor of the print device contributes to reducing, more than before, the loss of tension applied to the medium due to the friction load at the bent portion of the medium, compared to when the entire bent portion of the medium is received by the tensioner.

Embodiments also provide a print device that includes a supply unit, a print unit, a conveyer, a tensioner, and a rotor. The supply unit is configured to supply a long medium. The print unit is configured to print an image on a first surface of the medium fed out from the supply unit. The print unit is disposed above the supply unit. The conveyer has a pair of rollers rotating around an axis extending in an axial direction. The conveyer is configured to nip and to convey, with the pair of rollers, the medium in a conveyance direction from the supply unit toward the print unit. The conveyer is positioned upstream of the print unit in the conveyance direction. The tensioner is configured to contact a second surface of the medium on a side opposite the first surface of the medium to cause the medium to bend, and to apply tension to the medium. The tensioner is disposed above the supply unit, and is pivotably supported around an axis extending in the axial direction, at a position upstream of the conveyer in the conveyance direction. The rotor is rotatably supported around an axis extending in the axial direction. The rotor is positioned upstream of the conveyer in the conveyance direction, and positioned downstream, in the conveyance direction, of an upstream end portion, in the conveyance direction, of the tensioner. The rotor is configured to contact the second surface of the medium, and to arrange the medium in a horizontal region with respect to a nipped point where the medium is to be sandwiched between the pair of rollers. The print device is configured to receive, with the rotor, part of a bent portion where the medium that reaches the conveyer from the supply unit bends. Rolling friction is generally smaller than sliding friction. Therefore, the rotor of the print device contributes to reducing, more than before, the loss of tension applied to the medium due to the friction load at the bent portion of the medium, compared to when the entire bent portion of the medium is received by the tensioner.

Embodiments also provide a print device that includes a supply unit, a print unit, a conveyer, a tensioner, and a rotor. The supply unit is configured to supply a long medium. The print unit is configured to print an image on a first surface of the medium fed out from the supply unit. The print unit is disposed above the supply unit. The conveyer has a pair of rollers rotating around an axis extending in an axial direction. The conveyer is configured to nip and to convey, with the pair of rollers, the medium in a conveyance direction from the supply unit toward the print unit. The conveyer is positioned upstream of the print unit in the conveyance direction. The tensioner is configured to contact a second surface of the medium on a side opposite the first surface of the medium to cause the medium to bend, and to apply tension to the medium. The tensioner is disposed above the supply unit, and is pivotably supported around an axis extending in the axial direction, at a position upstream of the conveyer in the conveyance direction. The rotor is rotatably supported around an axis extending in the axial direction. The rotor is positioned upstream of the conveyer in the conveyance direction, and positioned downstream, in the conveyance direction, of an upstream end portion, in the conveyance direction, of the tensioner. The rotor is positioned such that an upper end of the rotor is above a virtual line segment. The virtual line segment is a line segment connecting an upper end of the tensioner and a nipped point where the medium is to be sandwiched between the pair of rollers. The rotor is configured to contact the second surface of the medium. The print device is configured to receive, with the rotor, part of a bent portion where the medium that reaches the conveyer from the supply unit bends. Rolling friction is generally smaller than sliding friction. Therefore, the rotor of the print device contributes to reducing, more than before, the loss of tension applied to the medium due to the friction load at the bent portion of the medium, compared to when the entire bent portion of the medium is received by the tensioner.

Embodiments further provide a conveyance device that includes a supply unit, a conveyer, a tensioner, and a rotor. The supply unit is configured to supply a long medium. The conveyer has a pair of rollers rotating around an axis extending in an axial direction. The conveyer is configured to nip and to convey, with the pair of rollers, the medium in a conveyance direction from the supply unit toward a print unit configured to print an image on the medium. The conveyer is positioned upstream of the print unit in the conveyance direction. The tensioner is configured to contact a second surface of the medium on a side opposite a first surface of the medium on which the image is printed by the print unit, causing the medium to bend, and to apply tension to the medium. The tensioner is disposed above the supply unit, and is pivotably supported around an axis extending in the axial direction, at a position upstream of the conveyer in the conveyance direction. The rotor is rotatably supported around an axis extending in the axial direction. The rotor is positioned upstream of the conveyer in the conveyance direction, and positioned downstream, in the conveyance direction, of an upstream end portion, in the conveyance direction, of the tensioner. The rotor is positioned such that an upper end of the rotor and a nipped point where the medium is to be sandwiched between the pair of rollers are at a same height. The rotor is configured to contact the second surface of the medium. The conveyance device is configured to receive, with the rotor, part of a bent portion where the medium that reaches the conveyer from the supply unit bends. Rolling friction is generally smaller than sliding friction. Therefore, the rotor of the conveyance device contributes to reducing, more than before, the loss of tension applied to the medium due to the friction load at the bent portion of the medium, compared to when the entire bent portion of the medium is received by the tensioner.

BRIEF DESCRIPTION OF THE DRAWINGS

Embodiments will be described below in detail with reference to the accompanying drawings in which.

DETAILED DESCRIPTION

Figure 1:
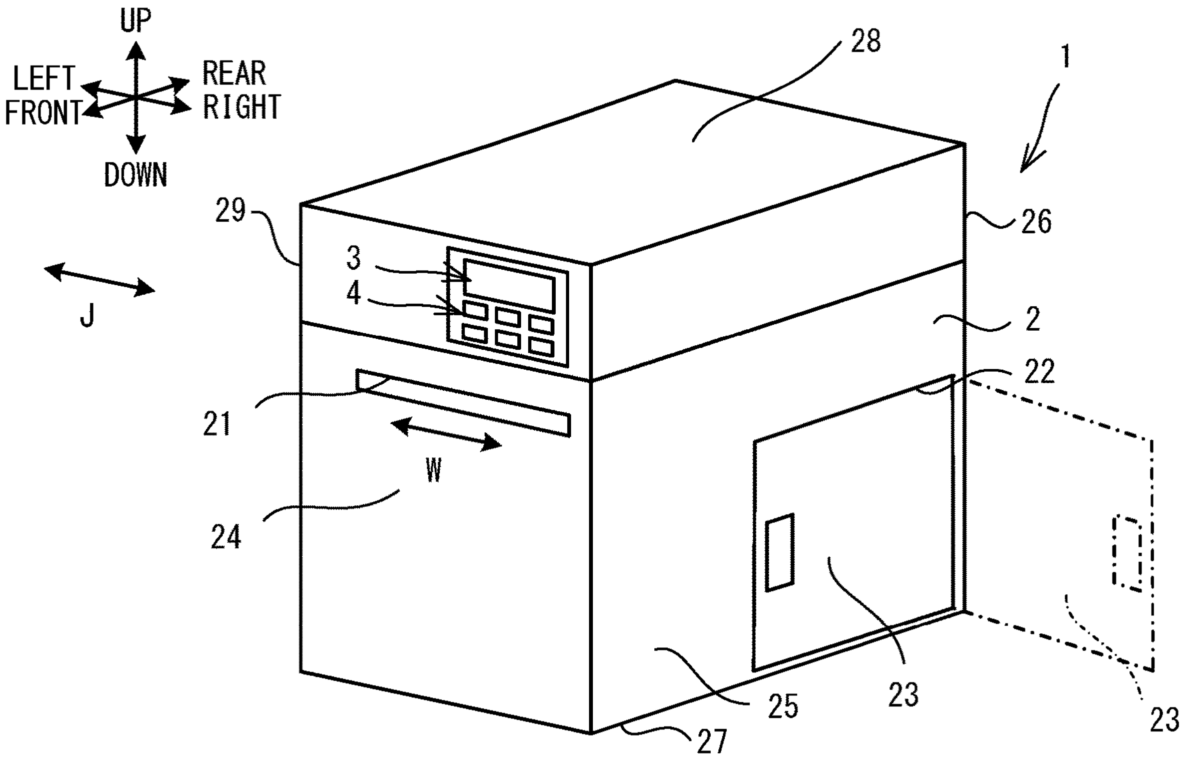
FIG. 1 is a perspective view of a print device.

A print device 1 according to an embodiment of the present disclosure will be described with reference to the drawings. The drawings that are referenced are used to illustrate the technical characteristics that can be employed by the present disclosure. The configurations and the like of the devices that are described are not intended to be limited thereto, but are merely illustrative examples. In the description of the present embodiment, the left lower side, the right upper side, the right lower side, the left upper side, the upper side, and the lower side in FIG. 1 are, respectively, the front side, the rear side, the right side, the left side, the upper side, and the lower side of the print device 1. The left-right direction is also referred to as an axial direction J and a width direction W.

A physical configuration of the print device 1 will be described with reference to FIG. 1 and FIG. 2. As illustrated in FIG. 1, the print device 1 is provided with a housing 2, a display unit 3, and an operation unit 4. The housing 2 includes a front wall 24, a right wall 25, a rear wall 26, a left wall 29, a lower wall 27, an upper wall 28, and a cover 23. The housing 2 is a cuboid shape of a size that can be placed on a table. A discharge opening 21 and an opening 22 are formed in the housing 2. The discharge opening 21 is formed in a rectangular shape that is long in the left-right direction in a front view, in the front wall 24 of the housing 2. The opening 22 is formed in a rectangular shape in a right side view, in a rear lower portion of the right wall 25 of the housing 2. The cover 23 is a plate having a rectangular shape in a right side view, and is supported at a rear lower portion of the right side surface of the housing 2 such that the cover 23 can rotate between a closed position, illustrated using a solid line in FIG. 1, in which the opening 22 is closed, and an open position, illustrated using an alternate long and short dash line in FIG. 1, in which the opening 22 is open. The display unit 3 is provided at an upper right portion in the front surface of the front wall 24 of the housing 2, and displays an image. The operation unit 4 is provided below the display unit 3, of the upper right portion of the front surface of the front wall 24 of the housing 2, and is configured by a plurality of buttons used to input various commands. The display unit 3 and the operation unit 4 are provided above the discharge opening 21.

Figure 2:
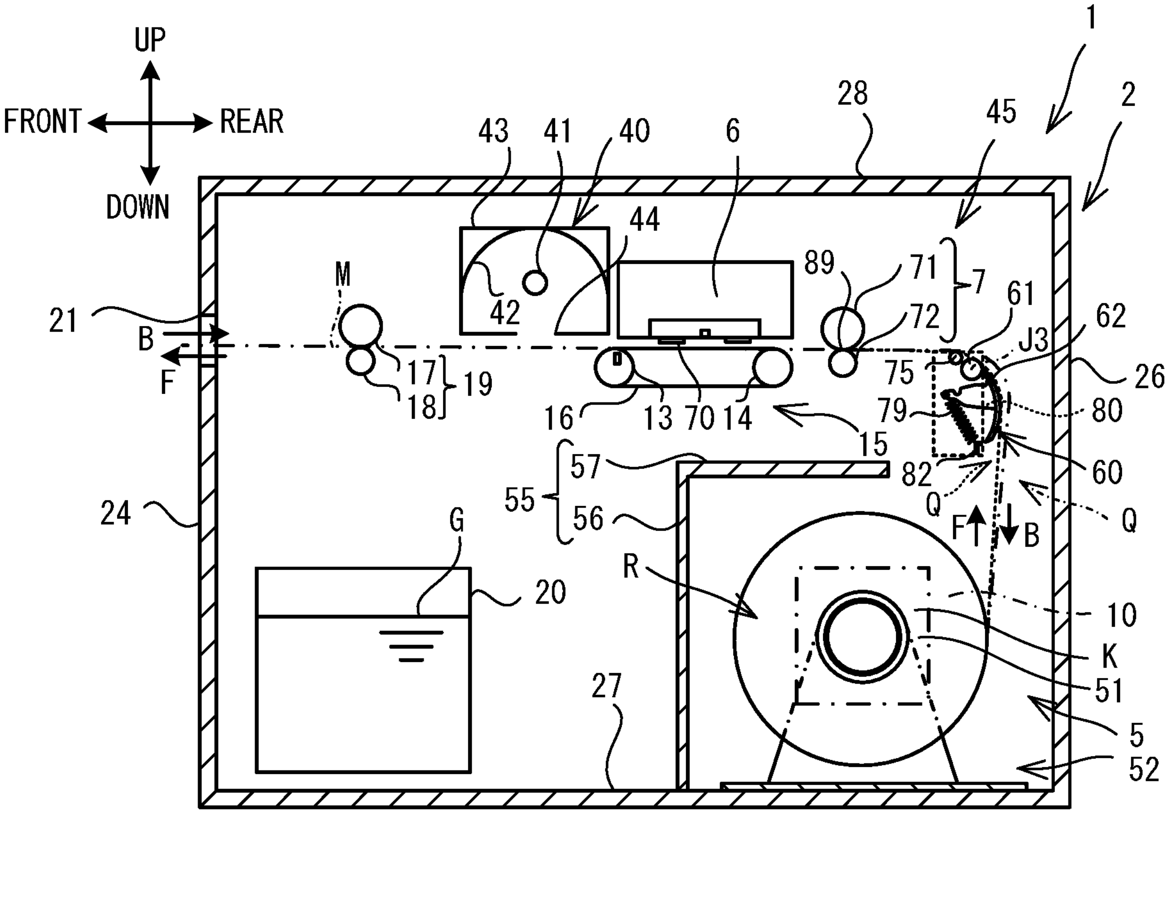
FIG. 2 is a cross-sectional view illustrating an internal configuration of the print device.

As illustrated in FIG. 2, the print device 1 houses, inside the housing 2, a conveyance device 45, a partition wall 55, a print unit 6, and a fixing unit 40. The print device 1 is an inkjet printer configured to perform printing on a long medium M. The medium M is a medium having an elongated shape wound in a roll shape on a tubular paper tube K, for example. The conveyance device 45 is provided with a supply unit 5, conveyers 7, 10, 15, and 19, a support portion 80, a tensioner 60, and a rotor 75. The supply unit 5 is provided to the left of the cover 23 that is in the closed position illustrated by the solid line in FIG. 1, and in a space in a rear lower portion of the print device 1 surrounded by the partition wall 55 and the rear wall 26 illustrated in FIG. 2. The supply unit 5 is configured to hold a roll R. The supply unit 5 of the present embodiment is provided with a shaft portion 51 and a magazine 52. The shaft portion 51 extends in the left-right direction, and is inserted through the paper tube K of the roll R. The magazine 52 is a support base having a U-shape in a front view. The magazine 52 supports both left and right ends of the shaft portion 51 such that the shaft portion 51 can rotate around an axis extending in the left-right direction. The shaft portion 51 is detachably supported by the magazine 52. The magazine 52 is detachably supported by the print device 1. When a user of the print device 1 replaces the roll R, the user disposes the cover 23 in the open position illustrated in FIG. 1, detaches the magazine 52 illustrated in FIG. 2 from inside the housing 2, and performs the replacement operation of the roll R. The partition wall 55 includes a first wall portion 56 extending upward from the lower wall 27 of the housing 2, and a second wall portion 57 extending to the rear from the upper end of the first wall portion 56, and partitions the internal space of the housing 2. The second wall portion 57 is separated from the rear wall 26 of the housing 2 in the front-rear direction.

The print unit 6 is configured to print an image on the medium M supplied from the supply unit 5. The print unit 6 of the present embodiment is provided with a plurality of nozzles 70 that are configured to discharge a liquid Gin a discharge direction, and is an inkjet head that performs the printing of the image on the medium M by discharging the liquid G from the plurality of nozzles 70. The discharge direction of the present embodiment is the downward direction, and the print unit 6 is provided in a posture in which the plurality of nozzles 70 are oriented downward, above a conveyance path Q of the medium M. The conveyance path Q is a path along which the medium M fed out from the supply unit 5, and is conveyed until the medium M is discharged to the outside of the housing 2 from the discharge opening 21. The liquid G is supplied to the print unit 6, via a tube that is not illustrated, from a tank 20 disposed inside the housing 2.

The conveyer 7 is configured to convey the medium M in a conveyance direction F from the supply unit 5 to the print unit 6, and in return direction B that is the opposite direction to the conveyance direction F, respectively. The conveyance direction F is a direction along the conveyance path Q from the supply unit 5 toward the print unit 6. The conveyance direction F is a direction intersecting the left-right direction that is an extending direction of the rotation axis of the roll R, and is a direction that changes in accordance with the position on the conveyance path Q. The conveyance direction F from the supply unit 5 to the tensioner 60 is a direction that changes in accordance with a remaining amount of the medium M, and when the remaining amount of the medium M is an initial value, that is, the remaining amount immediately after the replacement of the roll R, the conveyance direction F is substantially upward. The conveyance direction F from the tensioner 60 to the discharge opening 21 is substantially to the front. In other words, in the print device 1, at a section at which the medium M comes into contact with the tensioner 60, the conveyance path Q bends, and the conveyance direction F changes from upward toward the front.

The conveyer 7 includes a conveyance roller 71 that is configured to rotate around an axis J1 extending in the axial direction J and a pinch roller 72 that is configured to rotate around axis J2 extending in the axial direction J. The conveyer 7 is configured to nip and to convey the medium M by sandwiching the medium M from above and below between the conveyance roller 71 and the pinch roller 72. The axial direction J is the left-right direction. The conveyer 7 is positioned upstream of the print unit 6 in the conveyance direction F, and positioned downstream of the supply unit 5 in the conveyance direction F. In other words, the conveyer 7 is provided between the print unit 6 and the supply unit 5, on the conveyance path Q of the medium M.

The conveyer 10 is positioned downstream of the conveyer 7 in the conveyance direction F, and is configured to convey the medium M in the conveyance direction F and the return direction B, respectively. The conveyer 10 of the present embodiment is configured to rotate the roll R held by the supply unit 5 to convey the medium M in the return direction B, and to wind the medium M onto the roll R. The conveyer 10 of the present embodiment detachably engages with the shaft portion 51 of the supply unit 5. The conveyer 10 is configured to rotate the roll R held by the supply unit 5 to convey the medium M in the conveyance direction F, and to feed out the medium M from the roll R toward the print unit 6.

The support portion 80 is positioned downstream of the conveyer 7 in the conveyance direction F, and positioned upstream of the conveyer 10 in the conveyance direction F, and supports the tensioner 60 and the rotor 75. The tensioner 60 is configured to contact a second surface M2 of the medium M, which is on the opposite side from a first surface M1 of the medium M to bend the medium M, and to apply tension to the medium M. The tension is tension that acts in the direction opposite the advancing direction of the medium M. The tensioner 60 is disposed above the supply unit 5, and is supported so as to be able to pivot around an axis J3 extending in the axial direction J, at a location upstream of the conveyer 7 in the conveyance direction F. The tensioner 60 is provided between the conveyer 7 and the conveyer 10 on the conveyance path Q. The rotor 75 is supported so as to be able to rotate around an axis J4 extending in the axial direction J. The rotor 75 is positioned upstream of the conveyer 7 in the conveyance direction F, and positioned downstream, in the conveyance direction F, of an upstream end portion, in the conveyance direction F, of the tensioner 60 i.e., positioned downstream of the lower end portion of the tensioner 60 in the conveyance direction F.

The conveyer 15 is provided below the print unit 6, and positioned downstream of the conveyer 7 in the conveyance direction. The conveyer 15 is configured to convey the medium M in the conveyance direction F. The conveyer 15 is provided with a drive roller 13, a driven roller 14, and an endless belt 16. The drive roller 13 and the driven roller 14 are separated from each other in the front-rear direction. The endless belt 16 is stretched between the drive roller 13 and the driven roller 14. The driven roller 14 is configured to rotate in accordance with the rotation of the endless belt 16. The upper end on an outer peripheral surface of the endless belt 16 is in substantially the same position, in the up-down direction, as a nipped point 89 of the medium M that is nipped by the conveyer 7, and faces the plurality of nozzles 70 of the print unit 6. In the conveyance direction F, the upper end on the outer peripheral surface of the endless belt 16 is configured to support and to convey, from below, the medium M conveyed between the conveyer 7 and the conveyer 19, in a state of sucking the medium M against the endless belt 16 using static electricity or a negative pressure.

The fixing unit 40 is disposed downstream of the print unit 6 in the conveyance direction, and disposed upstream of the conveyer 19 in the conveyance direction. The fixing unit 40 is a halogen heater and includes a halogen lamp 41, a reflective plate 42, and a housing 43. An opening 44 in the left-right direction is formed in a lower wall of the housing 43. The fixing unit 40 is configured to radiate infrared rays through the opening 44, and is configured to heat the medium M passing directly below the opening 44. In this way, the liquid G discharged by the print unit 6 onto the medium M is fixed to the medium M.

The conveyer 19 is positioned downstream of the print unit 6 and the fixing unit 40 in the conveyance direction, and positioned upstream of the discharge opening 21 in the conveyance direction. The conveyer 19 is configured to convey the medium M in the conveyance direction F and the return direction B, respectively. The conveyer 19 includes a conveyance roller 17 and a pinch roller 18 that rotate around axes extending in the left-right direction, and is configured to nip and to convey the medium M by sandwiching the medium M from above and below between the conveyance roller 17 and the pinch roller 18.

In the print device 1, when printing is executed, a control unit of the print device 1 drives the conveyers 7, 10, 15, and 19 to convey the medium M. The print device 1 adjusts the driving amounts of the conveyers 7 and 10 such that tension is applied to the medium M by the tensioner 60. The control unit of the print device 1 is configured to drive the print unit 6 in synchronization with the conveyance of the medium M, and discharges the liquid G onto the medium M. The control unit of the print device 1 is configured to drive the halogen lamp 41 to fix the liquid G on the medium M to the medium M. The medium M is then discharged out of the housing 2 through the discharge opening 21.

Figure 3:
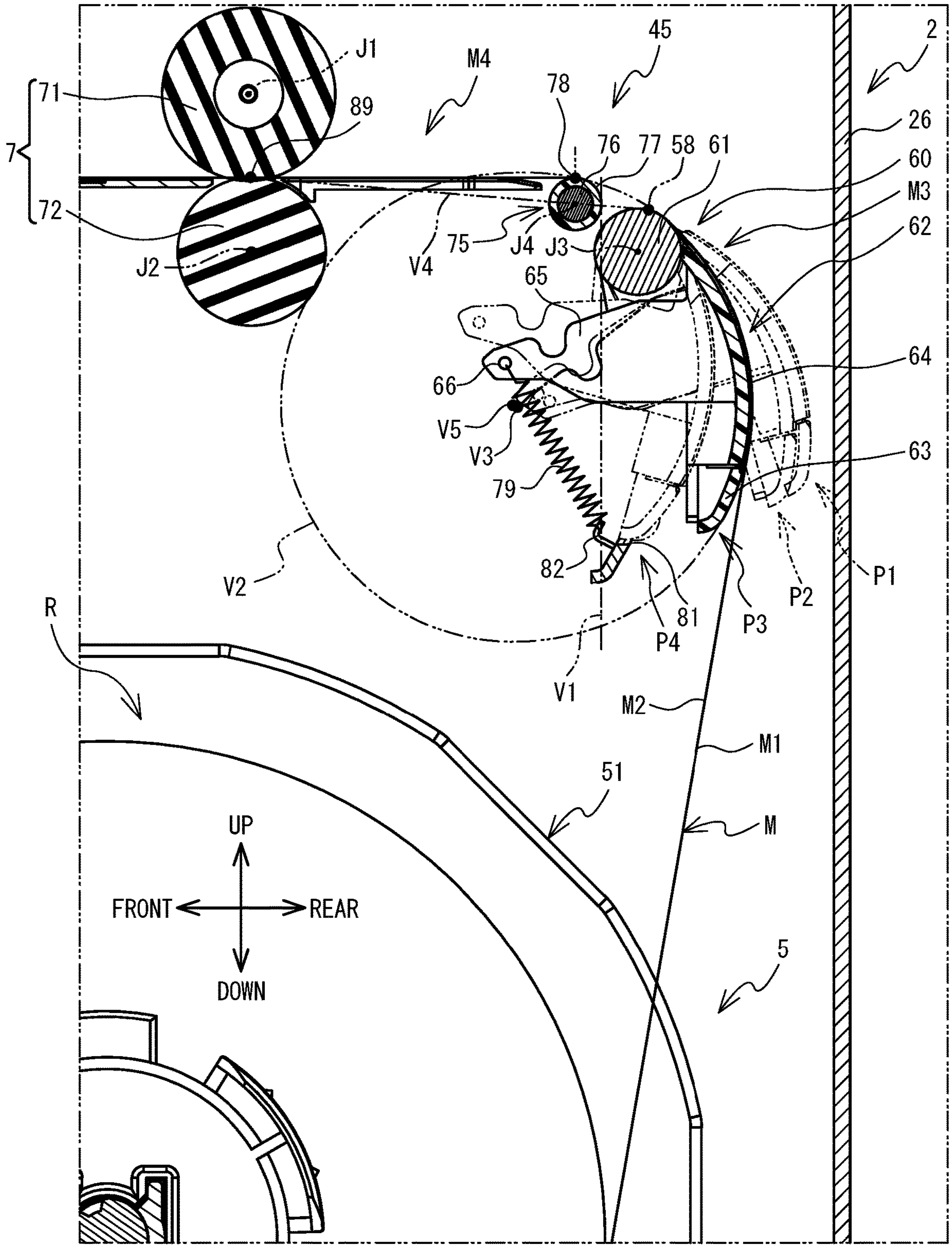
FIG. 3 is an enlarged cross-sectional view of a conveyance device in the internal configuration of the print device.

The tensioner 60, the rotor 75, and a shaft 76 of the conveyance device 45 will now be described in detail with reference to FIG. 3 to FIG. 5. As illustrated in FIG. 3, the tensioner 60 is provided with a pivot shaft 61, a pivot member 62, and a tension application portion 65, and an urging member 79. The pivot shaft 61 extends in the axial direction J. The pivot shaft 61 is provided on the downstream end portion, in the conveyance direction F, of the pivot member 62, i.e., on the upper end portion of the pivot member 62. The pivot member 62 is supported so as to be able to pivot around the pivot shaft 61, and has an outer peripheral surface 64 that is configured to contact the second surface M2 of the medium M. The outer peripheral surface 64 of the pivot member 62 has an arc-like shape around an axis V5 extending in the axial direction J. The pivot member 62 has an arc-like shape protruding rearward in a right side view. The outer peripheral surface 64 of the pivot member 62 is the back surface of the pivot member 62. The radius of the pivot member 62 is larger than the radius of the pivot shaft 61. The pivot member 62 is provided with a planar contact portion 63 that can come into contact with the medium M, on the upstream end portion in the conveyance direction F, i.e., the lower end portion, of the outer peripheral surface 64. The distance from the axis V5 to the contact portion 63 is substantially the same along the entire range over which the contact portion 63 extends. That is, no protruding or recessed portions are formed on the contact portion 63.

The pivot member 62 is configured to pivot back and forth between a position P1 and a position P4 around the pivot shaft 61. The position P1 is a standby position, and is the rear end of a pivotable range of the pivot member 62. The control unit of the print device 1 is configured to drive the conveyers 7 and 10 to place the pivot member 62 in the position P1 when the process of conveying the medium M in the conveyance direction F has ended, or when the medium M is conveyed in the return direction B, for example. When the pivot member 62 is in the position P1, the medium M is in a state raised and partly separated from the pivot member 62. When the pivot member 62 is in the position P1, the contact portion 63 of the pivot member 62 is positioned farthest to the rear and contacts the medium M. When the pivot member 62 is in the position P1, the tensioner 60 does not apply tension to the medium M. A position P2 is a position in which the pivot member 62 is pivoted slightly forward from the position P1. A position P3 is a functional position. The control unit of the print device 1 is configured to control the conveyers 7 and 10 to place the pivot member 62 in the position P3 when executing a process to convey the medium M in the conveyance direction F, for example. When the pivot member 62 is in the position P3, a portion of the pivot member 62 that is above the contact portion 63 is positioned farthest to the rear. When the pivot member 62 is in the position P3, the tensioner 60 applies tension to the medium M. The position P4 is a position in which the pivot member 62 is pivoted forward from the position P3, and is the front end of the pivotable range.

The tension application portion 65 has a plate shape extending rearward from the center portion in the left-right direction of the front surface of the pivot member 62. A hole 66 passing through in the left-right direction is formed in a front end portion of the tension application portion 65. The urging member 79 urges the pivot member 62 toward the side where the medium M is to be arranged. The urging member 79 is a coil spring, for example. One end portion of the urging member 79 is fixed to the hole 66 in the tension application portion 65, and the other end portion of the urging member 79 is fixed to an attaching portion 82 of the support portion 80. The attaching portion 82 is an L-shaped hook provided on the support portion 80. The urging member 79 urges the pivot member 62 in the counterclockwise direction in a right side view, around the pivot shaft 61 by urging the tension application portion 65 downward toward the rear.

The rotor 75 and the tensioner 60 are in the following positional relationship. The rotor 75 and the tensioner 60 define, in a virtual plane perpendicular to the rotational center of the rotor 75, a virtual circle V2 inscribed in the rotor 75, the pivot shaft 61, and the outer peripheral surface 64 of the pivot member 62 placed in a predetermined position, and having a center V3 on a supply unit 5 side with respect to the pivot shaft 61. The predetermined position is the position P3, for example. When the medium M is conveyed in the conveyance direction F while under tension from the tensioner 60, a bent portion M3 of the medium M is disposed along the virtual circle V2. The axis J3 that is the rotational center of the pivot shaft 61 is disposed in a region on the side opposite a conveyer 7 side with respect to a virtual line V1 extending in the vertical direction from the downstream end portion of the rotor 75, in the conveyance direction F, of the rotor 75, i.e., from the right end portion of the rotor 75, in a region inside the virtual circle V2. The center V3 of the virtual circle V2 is disposed in a region on the conveyer 7 side with respect to the virtual line V1, in a region below the pivot shaft 61 and inside the virtual circle V2. The radius of the virtual circle V2 is preferably equal to or greater than the radius of the paper tube K of the long medium M so that peeling does not occur in the medium M of a die-cut label or the like, for example. This is because it is thought that peeling will not occur on a path having a radius of equal to or larger than the radius of the paper tube K, since it is assumed that peeling does not occur when the long medium M is wound on the roll R.

The rotor 75 is provided separately from the pivot shaft 61, and is provided downstream of the pivot shaft 61 in the conveyance direction F. The rotor 75 is positioned such that an upper end 78 of the rotor 75 and the nipped point 89 where the medium M is to be sandwiched between the rollers 71 and 72 are at the same height, and contacts the second surface M2 of the medium M. The rotor 75 places the medium M in a horizontal region with respect to the nipped point 89 where the medium M is to be sandwiched between the rollers 71 and 72. That is, the medium M of a portion M4 between the nipped point 89 and the rotor 75 extends horizontally. The rotor 75 is positioned such that the upper end 78 of the rotor 75 is above a virtual line segment V4 connecting the nipped point 89 where the medium M is to be sandwiched between the rollers 71 and 72 and an upper end 58 of the tensioner 60.

Figure 4:
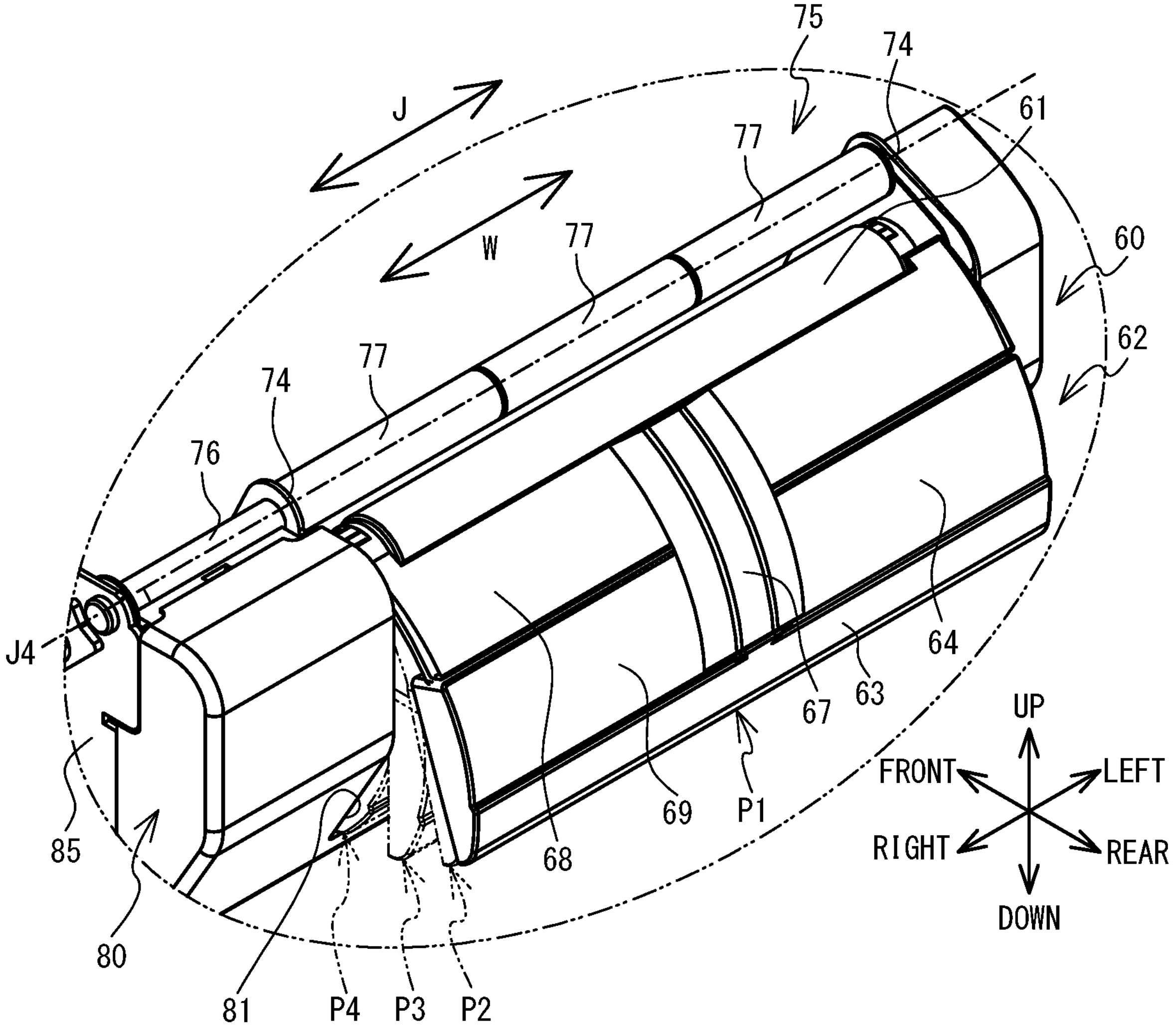
FIG. 4 is a perspective view of a tensioner and a rotor.

As illustrated in FIG. 4, the rotor 75 has a cylindrical shape extending along the axis J4 of the rotor 75. The rotor 75 includes three cylindrical bodies 77. The three cylindrical bodies 77 all have the same shape, and are lined up without gaps therebetween in the left-right direction. The shaft 76 extends along the axis and is inserted through each of the three cylindrical bodies 77. The shaft 76 supports all of the three cylindrical bodies 77 in a manner enabling them to rotate with respect to the shaft 76.

The support portion 80 has a U-shape that opens upward in a back view. The support portion 80 has a recessed portion 81 that is recessed downward, and a pair including left and right partition plates 74. The support portion 80 arranges the rotor 75 and the tensioner 60 in the recessed portion 81. The pair including left and right partition plates 74 are disposed on the left end and the right end, respectively, of the recessed portion 81. The shaft 76 is inserted through the pair including left and right partition plates 74. The three cylindrical bodies 77 are disposed between the pair including left and right partition plates 74, and the three cylindrical bodies 77 are positioned in the left-right direction by the pair including left and right partition plates 74. A plate body 85 is fixed to the right surface of the support portion 80. The plate body 85 supports the right end of the shaft 76. The support portion 80 supports the pivot shaft 61 of the tensioner 60 to the rear of the rotor 75.

The pivot member 62 is provided with an upper portion 68, a center portion 69, and a protruding portion 67, in addition to the contact portion 63. The upper portion 68 has a planar shape extending in the left-right direction on the upper portion of the pivot member 62. The center portion 69 has a planar shape extending in the left-right direction between the upper portion 68 and the contact portion 63. The protruding portion 67 is provided at a center portion in a width direction W parallel to the axial direction J on the outer peripheral surface 64. The protruding portion 67 extends in a band shape in the up-down direction from the upper end portion of the pivot member 62 to the contact portion 63. The distance from the axis V5 that forms the center of the arc of the outer peripheral surface 64 of the pivot member 62 to the protruding portion 67 is longer than both the distance from the axis V5 to the upper portion 68, and the distance from the axis V5 to the center portion 69. The distance from the axis V5 to the protruding portion 67 is substantially equal to the distance from the axis V5 to the contact portion 63. The extension range of the protruding portion 67 in the left-right direction is narrower than the extension range of the cylindrical bodies 77 disposed at the center portion in the left-right direction. The conveyer 7 is configured to convey the medium M with the center of the medium M in the width direction W as the center of the pivot member 62 in the width direction W. When the pivot member 62 is in the position P3, the protruding portion 67 of the pivot member 62 contacts the center portion of the medium M in the width direction W, and applies tension to the medium M. As a result, the medium M is conveyed in the conveyance direction F in a state spread out from the center portion of the medium M in the width direction W toward the end portions of the medium M in the width direction W.

Figure 5:
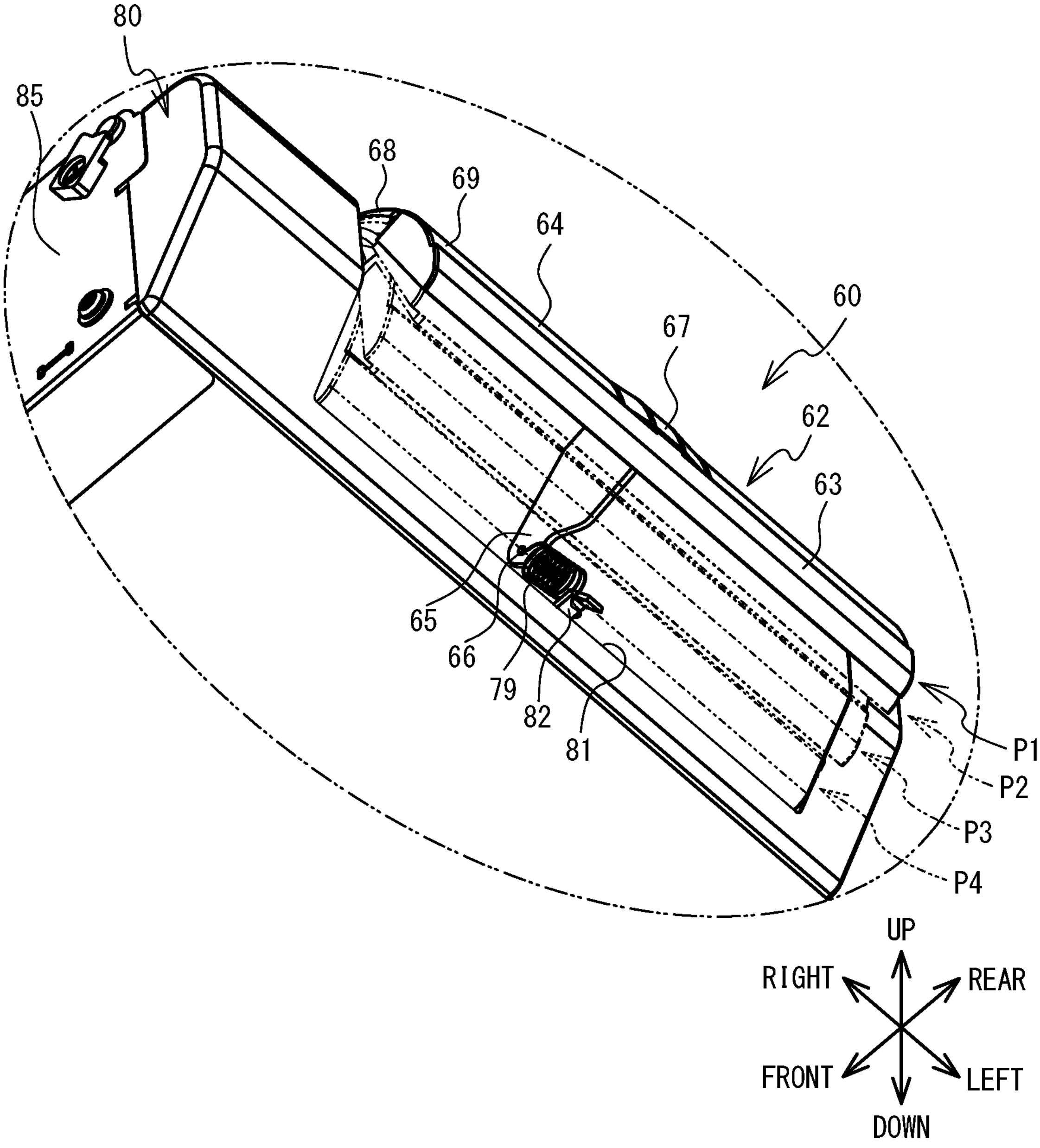
FIG. 5 is a perspective view of the tensioner.

As illustrated in FIG. 5, when the pivot member 62 is in the position P1, the contact portion 63 is in the rearmost position, and the contact portion 63 contacts the medium M. The contact portion 63 protrudes rearward from the center portion 69, and there is a step at the boundary of the contact portion 63 and the center portion 69. The protruding portion 67 has a tapered shape in which the distance from the axis V5 is largest at the center portion in the left-right direction, and becomes smaller toward the end portions of the protruding portion 67 in the left-right direction.

The print device 1 of the foregoing embodiment is provided with the supply unit 5, the print unit 6, the conveyer 7, the tensioner 60, and the rotor 75. The supply unit 5 is configured to supply the long medium M. The print unit 6 is disposed above the supply unit 5, and prints an image on the first surface M1 of the medium M fed out from the supply unit 5. The conveyer 7 has the roller 71 configured to rotate around the axis J1 extending in the axial direction J, and the roller 72 configured to rotate around the axis J2 extending in the axial direction J. The conveyer 7 is configured to nip and to convey the medium M in the conveyance direction F from the supply unit 5 toward the print unit 6 with the rollers 71 and 72. The conveyer 7 is provided upstream of the print unit 6 in the conveyance direction F. The tensioner 60 is disposed above the supply unit 5, and is supported so as to be able to pivot around the axis J3 extending in the axial direction J, at a location upstream of the conveyer 7 in the conveyance direction F. The tensioner 60 is configured to contact the second surface M2 of the medium M on the side opposite the first surface M1 of the medium M to causes the medium M to bend, and to apply tension to the medium M. The rotor 75 is supported so as to be able to rotate around an axis extending in the axial direction J. The rotor 75 is positioned upstream of the conveyer 7 in the conveyance direction F, and positioned downstream in the conveyance direction F of the upstream end portion, in the conveyance direction F, of the tensioner 60. The rotor 75 is positioned such that the upper end 78 of the rotor 75 and the nipped point 89 where the medium M is to be sandwiched between the rollers 71 and 72 are at the same height, and contacts the second surface M2 of the medium M. The rotor 75 contacts the second surface M2 of the medium M, and places the medium M in a region horizontal to the nipped point 89 where the medium M is to be sandwiched between the rollers 71 and 72. The rotor 75 is positioned such that the upper end 78 of the rotor 75 is above the virtual line segment V4 connecting the nipped point 89 where the medium M is to be sandwiched between the rollers 71 and 72 and the upper end 58 of the tensioner 60, and contacts the second surface M2 of the medium M. The print device 1 is configured to receive, with the rotor 75, part of the bent portion M3 where the medium M that reaches the conveyer 7 from the supply unit 5 bends. Rolling friction is generally smaller than sliding friction. Therefore, the rotor 75 of the print device 1 contributes to reducing, more than before, the loss of tension applied to the medium M due to the friction load at the bent portion M3 of the medium M, compared to when the entire bent portion M3 of the medium M is received by the tensioner 60.

The tensioner 60 of the print device 1 is provided with the pivot shaft 61, the pivot member 62, and the urging member 79. The pivot shaft 61 extends in a direction intersecting the conveyance direction F. The pivot member 62 is supported in a manner able to pivot around the pivot shaft 61, and has the outer peripheral surface 64 that contacts the second surface M2. The urging member 79 urges the pivot member 62 to the side where the medium M is arranged. The rotor 75 is provided separate from the pivot shaft 61, and is provided downstream of the pivot shaft 61 in the conveyance direction F. Therefore, the tensioner 60 and rotor 75 of the print device 1 contributes to increasing the curvature of the bent portion M3 in the conveyance direction F, which is defined by the rotor 75 and the tensioner 60, compared to when the pivot shaft 61 and the rotor 75 are integrally provided.

The pivot shaft 61 of the print device 1 is provided on the downstream end portion in the conveyance direction F of the pivot member 62. When the pivot shaft 61 is disposed on the downstream end portion, in the conveyance direction F, of the pivot member 62, the medium M contacts the rotor 75 and the upstream end portion, in the conveyance direction F, of the outer peripheral surface 64 of the pivot member 62. The tensioner 60 can pivot in a state where the upstream end portion, in the conveyance direction F, of the outer peripheral surface 64 of the pivot member 62 is in contact with the medium M. Therefore, the pivot shaft 61 of the print device 1 contributes to easily controlling the tension applied to the medium M, compared to a case in which the pivot shaft 61 is disposed on the upstream end portion, in the conveyance direction F, of the pivot member 62.

The rotational center of the pivot shaft 61 of the print device 1 is disposed in a region on the side opposite to the conveyer 7 side with respect to the virtual circle V2, with respect to the virtual line V1 extending in a vertical direction from the downstream end portion, in the conveyance direction F of the rotor 75, in the region inside the virtual circle V2. The virtual circle V2 is inscribed in the rotor 75, the pivot shaft 61, and the outer peripheral surface 64 of the pivot member 62 placed in a predetermined position, in a virtual plane perpendicular to the rotational center of the rotor 75, and has a center on the supply unit 5 side with respect to the pivot shaft 61. With the print device 1, the rotor 75 and the tensioner 60 can be arranged relatively close together, so the print device 1 can be smaller in size compared to a device in which the rotor 75 and the tensioner 60 are in positions that are relatively far apart.

The pivot member 62 of the print device 1 is provided with the protruding portion 67 at the center portion of the outer peripheral surface 64 in the width direction W parallel to the axial direction J. The conveyer 7 is configured to convey the medium M with the center of the medium M in the width direction W as the center of the pivot member 62 in the width direction W. With the print device 1, the protruding portion 67 of the pivot member 62 can be placed in contact with the medium M regardless of the length of the medium M in the width direction W. Therefore, the pivot member 62 of the print device 1 contributes to stably applying tension to the medium M regardless of the length of the medium M in the width direction W.

The pivot member 62 of the print device 1 is provided with the planar contact portion 63 that can contact the medium M, on the upstream end portion, in the conveyance direction F, of the outer peripheral surface 64. The print device 1 can avoid partially concentrated tension being applied, compared to a case where there are protruding and recessed portions on the upstream end portion, in the conveyance direction F, of the outer peripheral surface 64. Therefore, when the medium M with perforations is conveyed, the pivot member 62 of the print device 1 contributes to inhibiting tearing along the perforations due to a large force being applied at some parts, for example.

The rotor 75 of the print device 1 includes the plurality of cylindrical bodies 77 extending along the axis J4 of the rotor 75. The print device 1 is provided with the shaft 76 that extends along the axis J4 and is inserted through all of the cylindrical bodies 77, and supports all of the plurality of cylindrical bodies 77 in a manner enabling these cylindrical bodies 77 to rotate with respect to the shaft 76. Because the print device 1 is provided with the plurality of cylindrical bodies 77, the cylindrical bodies 77 of a number corresponding to the length of the medium M in the width direction W can be caused to rotate. When the length of the medium M in the width direction W is relatively short, the print device 1 can cause only a portion of the plurality of cylindrical bodies 77 to rotate, so loss due to rolling friction of the cylindrical bodies 77 can be reduced compared to when the rotor 75 always rotates over the entire region in the width direction W. With the print device 1, no joint is arranged between the plurality of cylindrical bodies 77 at the portion contacting the center portion of the medium M in the width direction W. Therefore, the rotor 75 of the print device 1 contributes to reducing problems due to adjacent portions of the plurality of cylindrical bodies 77 being arranged at the portion contacting the center portion of medium M in the width direction W.

The rotor 75 of the print device 1 is formed from the cylindrical-shaped cylindrical bodies 77. The print device 1 is provided with the shaft 76 that extends along the axis J4 and is inserted through the rotor 75, and supports the rotor 75 in a manner enabling the rotor 75 to rotate with respect to the shaft 76. The rotor 75 of the print device 1 contributes to better avoiding a load concentrating at the end portions of the shaft 76 that supports the rotor 75 compared to when the rotor 75 and the shaft 76 are integrally formed.

The outer peripheral surface 64 of the pivot member 62 of the print device 1 has an arc-like shape centered on the axis V5 extending in the axial direction J. The radius of the pivot member 62 is larger than the radius of the pivot shaft 61. The pivot member 62 of the print device 1 contributes to increasing the curvature of the bent portion M3 of the medium M along the outer peripheral surface 64 of the pivot member 62 can be larger than it can when the radius of the pivot member 62 is equal to or smaller than the radius of the pivot shaft 61.

The print device and the conveyance device of the present disclosure are not limited to the above-described embodiment, and various modifications may be made without departing from the broad spirit and scope of the present disclosure. For example, the following modifications may be added as appropriate.

It is sufficient that the supply unit 5 be able to supply the long medium M, and a configuration of the supply unit 5 may be changed as appropriate. The medium M may be fan-fold paper that is folded along perforations cut into a sheet. The medium M need not have a perforation, a slit, or a cut. The conveyer 7 may convey the medium M using another conveyance member, such as a conveyance belt or the like. The conveyers 7, 10, 15, and 19 may be unable to convey the medium M in the return direction B, or the configurations thereof may be modified in accordance with the configuration of the supply unit 5. At least one selected from the group of the conveyers 10, 15, and 19 may be omitted, or the configuration thereof may be changed, as necessary.

The configuration of the print unit 6 may be changed as appropriate, and the print unit 6 may be an inkjet head that can perform color printing, or may be a thermal head using an electrophotographic method or a thermal method. The fixing unit 40 may be omitted, or the configuration thereof may be changed, in accordance with the printing method of the print device 1. The print device 1 may be provided with a cutter that cuts the medium M that has been printed, and a reading unit that reads a printed image, or the like.

The configuration of the tensioner 60 and the rotor 75 may be changed as appropriate. The type and mounting position and the like of the urging member 79 may be changed as appropriate. The pivot shaft 61 may be provided on the center portion of the pivot member 62 in the conveyance direction F, or on the upstream end portion of the pivot member 62, in the conveyance direction F, of the pivot. The pivot member 62 need not be provided with the protruding portion 67. The protruding portion 67 may be provided on an end portion of the pivot member 62 in the width direction W. The pivot member 62 may be provided with protruding and recessed portions on the upstream end portion of the outer peripheral surface 64 in the conveyance direction F. The number of cylindrical bodies 77 that the rotor 75 has may be changed as appropriate. The plurality of cylindrical bodies 77 need not all have the same shape. The rotor 75 and the shaft 76 may be integrally formed, in which case the print device 1 need only rotatably support the rotor 75. The rotor 75 may be integrally provided with the pivot shaft 61. The positional relationship of the rotor 75 and the tensioner 60 may be changed as appropriate. The outer peripheral surface 64 of the pivot member 62 need not have an arc-like shape. The radius of the pivot member 62 may be equal to or smaller than the radius of the pivot shaft 61. The rotational center of the pivot shaft 61 may be arranged on the side of the conveyer 7 of the virtual line V1 in the region inside the virtual circle V2.

Figure 6:
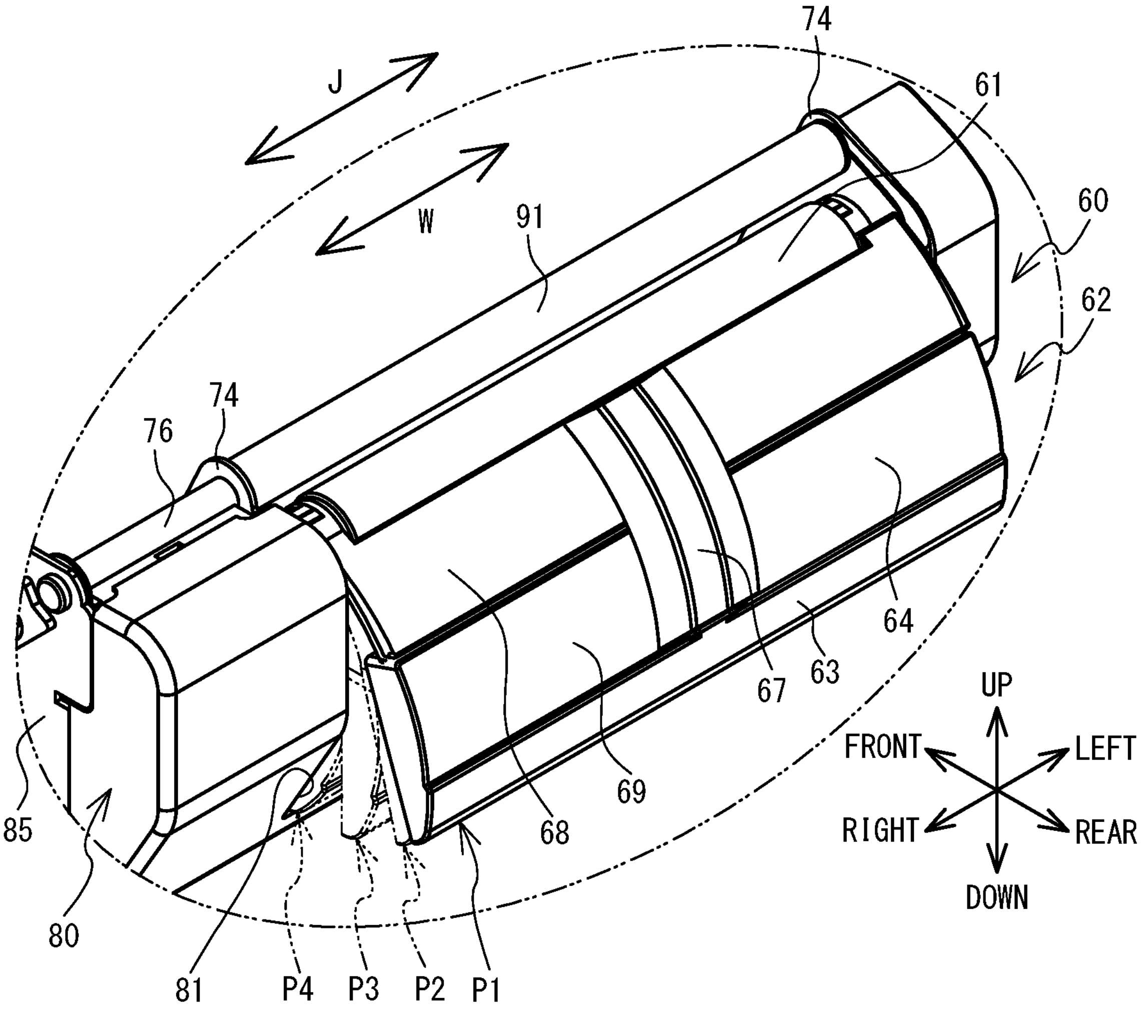
FIG. 6 is a perspective view of a tensioner and a rotor according to a modified example.

As illustrated in FIG. 6, the print device 1 may be provided with a rotor 91 instead of the rotor 75. In FIG. 6, the same reference characters are given to the same configurations as those of the print device 1 of the foregoing embodiment. The rotor 91 is a single member extending along the axis J4 of the rotor 75. The rotor 91 has a cylindrical shape and the shaft 76 is inserted therethrough. The rotor 91 is arranged between the pair including left and right partition plates 74, and is positioned in the left-right direction by the pair including left and right partition plates 74. The rotor 91 is able to rotate with respect to the shaft 76. With the print device 1 of the modified example, the rotor 91 is a single member, so there are no joints as there are in the device having the plurality of rotors 75. As a result, the effect that the joints between the plurality of rotors 75 have on the conveyance of the medium M can be suppressed.

The rotors 75 and 91 may have a length in the width direction W that is shorter than the length of the medium M in the width direction W, and may come into contact with a portion of the medium M in the width direction W. The rotors 75 and 91 may be disposed in a position at the center of the extendable range of the medium M in the width direction W if the print device 1 is able to be loaded with a plurality of various types of the medium M having different lengths in the width direction W, and the position of the medium M in the width direction W is aligned with the center of the medium M in the width direction W. The rotors 75 and 91 may be arranged at an end portion in the extendable range of the medium M in the width direction W if the position of the medium M in the width direction W is aligned with one end in the extendable range of the medium M in the width direction W.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A print device comprising:

a supply unit configured to supply a long medium;

a print unit configured to print an image on a first surface of the medium fed out from the supply unit, the print unit being disposed above the supply unit;

a conveyer having a pair of rollers rotating around an axis extending in an axial direction, the conveyer being configured to nip and to convey, with the pair of rollers, the medium in a conveyance direction from the supply unit toward the print unit, the conveyer being positioned upstream of the print unit in the conveyance direction;

a tensioner configured to contact a second surface of the medium on a side opposite the first surface of the medium to cause the medium to bend, and to apply tension to the medium, the tensioner being disposed above the supply unit, and being pivotably supported around an axis extending in the axial direction, at a position upstream of the conveyer in the conveyance direction; and a rotor rotatably supported around an axis extending in the axial direction, the rotor being positioned upstream of the conveyer in the conveyance direction, and positioned downstream, in the conveyance direction, of an upstream end portion, in the conveyance direction, of the tensioner, the rotor being positioned such that an upper end of the rotor and a nipped point where the medium is to be sandwiched between the pair of rollers are at a same height, the rotor being configured to contact the second surface of the medium, wherein the tensioner has a pivot shaft, a pivot member, and an urging member, the pivot shaft extending in the axial direction, the pivot member being rotatably supported around the pivot shaft, and having an outer peripheral surface configured to contact the second surface, the urging member urging the pivot member toward a side on which the medium is to be arranged, and the rotor is provided separately from the pivot shaft, and is positioned downstream of the pivot shaft in the conveyance direction, a first distance between a rotational center of the pivot shaft and a rotational center of the rotor is shorter than a second distance between a rotational center of a first roller of the pair of rollers and the rotational center of the rotor, the first roller being configured to contact the second surface of the medium.

2. The print device according to claim 1, wherein the pivot shaft is provided on a downstream end portion, in the conveyance direction, of the pivot member.

3. The print device according to claim 2, wherein the rotational center of the pivot shaft is arranged in a region on a side opposite a conveyer side with respect to a virtual line, in a region inside a virtual circle, in a virtual plane perpendicular to the rotational center of the rotor, the virtual circle inscribing the rotor, the pivot shaft, and the outer peripheral surface of the pivot member placed in a predetermined position, and having a center on a supply unit side with respect to the pivot shaft, the virtual line extending in a vertical direction from an upstream end portion, in the conveyance direction, of the rotor.

4. The print device according to claim 1, wherein the pivot member is provided with a protruding portion at a center portion of the outer peripheral surface in a width direction parallel to the axial direction, and the conveyer is configured to convey the medium with a center of the medium in the width direction as a center of the pivot member in the width direction.

5. The print device according to claim 4, wherein the pivot member is provided with a planar contact portion configured to contact the medium, at an upstream end portion, in the conveyance direction, of the outer peripheral surface.

6. The print device according to claim 1, wherein the rotor includes a plurality of cylindrical bodies extending along the axis of the rotor, and the print device is further provided with a shaft extending along the axis and inserted through each of the plurality of cylindrical bodies, the shaft supporting each of the plurality of cylindrical bodies in a manner such that each of the plurality of cylindrical bodies is configured to rotate with respect to the shaft.

7. The print device according to claim 1, wherein the rotor is a single member extending along the axis of the rotor.

8. The print device according to claim 7, wherein the rotor has a cylindrical shape, and the print device is further provided with a shaft extending along the axis and inserted through the rotor, the shaft rotatably supporting the rotor with respect to the shaft.

9. The print device according to claim 1, wherein the outer peripheral surface of the pivot member has an arc-like shape centered on an axis extending in the axial direction, and a radius of the pivot member is larger than a radius of the pivot shaft.

10. A print device comprising:

a supply unit configured to supply a long medium;

a print unit configured to print an image on a first surface of the medium fed out from the supply unit, the print unit being disposed above the supply unit;

a conveyer having a pair of rollers rotating around an axis extending in an axial direction, the conveyer being configured to nip and to convey, with the pair of rollers, the medium in a conveyance direction from the supply unit toward the print unit, the conveyer being positioned upstream of the print unit in the conveyance direction;

a tensioner configured to contact a second surface of the medium on a side opposite the first surface of the medium to cause the medium to bend, and to apply tension to the medium, the tensioner being disposed above the supply unit, and being pivotably supported around an axis extending in the axial direction, at a position upstream of the conveyer in the conveyance direction; and a rotor rotatably supported around an axis extending in the axial direction, the rotor being positioned upstream of the conveyer in the conveyance direction, and positioned downstream, in the conveyance direction, of an upstream end portion, in the conveyance direction, of the tensioner, the rotor being configured to contact the second surface of the medium, and to arrange the medium in a horizontal region with respect to a nipped point where the medium is to be sandwiched between the pair of rollers, wherein the tensioner has a pivot shaft, a pivot member, and an urging member, the pivot shaft extending in the axial direction, the pivot member being rotatably supported around the pivot shaft, and having an outer peripheral surface configured to contact the second surface, the urging member urging the pivot member toward a side on which the medium is to be arranged, and the rotor is provided separately from the pivot shaft, and is positioned downstream of the pivot shaft in the conveyance direction, a first distance between a rotational center of the pivot shaft and a rotational center of the rotor is shorter than a second distance between a rotational center of a first roller of the pair of rollers and the rotational center of the rotor, the first roller being configured to contact the second surface of the medium.

11. A print device comprising:

a supply unit configured to supply a long medium;

a print unit configured to print an image on a first surface of the medium fed out from the supply unit, the print unit being disposed above the supply unit;

a conveyer having a pair of rollers rotating around an axis extending in an axial direction, the conveyer being configured to nip and to convey, with the pair of rollers, the medium in a conveyance direction from the supply unit toward the print unit, the conveyer being positioned upstream of the print unit in the conveyance direction;

a tensioner configured to contact a second surface of the medium on a side opposite the first surface of the medium to cause the medium to bend, and to apply tension to the medium, the tensioner being disposed above the supply unit, and being pivotably supported around an axis extending in the axial direction, at a position upstream of the conveyer in the conveyance direction; and a rotor rotatably supported around an axis extending in the axial direction, the rotor being positioned upstream of the conveyer in the conveyance direction, and positioned downstream, in the conveyance direction, of an upstream end portion, in the conveyance direction, of the tensioner, the rotor being positioned such that an upper end of the rotor is above a virtual line segment, the virtual line segment being a line segment connecting an upper end of the tensioner and a nipped point where the medium is to be sandwiched between the pair of rollers, the rotor being configured to contact the second surface of the medium, wherein the tensioner has a pivot shaft, a pivot member, and an urging member, the pivot shaft extending in the axial direction, the pivot member being rotatably supported around the pivot shaft, and having an outer peripheral surface configured to contact the second surface, the urging member urging the pivot member toward a side on which the medium is to be arranged, and the rotor is provided separately from the pivot shaft, and is positioned downstream of the pivot shaft in the conveyance direction, a first distance between a rotational center of the pivot shaft and a rotational center of the rotor is shorter than a second distance between a rotational center of a first roller of the pair of rollers and the rotational center of the rotor, the first roller being configured to contact the second surface of the medium.

12. A conveyance device comprising:

a supply unit configured to supply a long medium;

a conveyer having a pair of rollers rotating around an axis extending in an axial direction, the conveyer being configured to nip and to convey, with the pair of rollers, the medium in a conveyance direction from the supply unit toward a print unit configured to print an image on the medium, the conveyer being positioned upstream of the print unit in the conveyance direction;

a tensioner configured to contact a second surface of the medium on a side opposite a first surface of the medium on which the image is printed by the print unit, causing the medium to bend, and to apply tension to the medium, the tensioner being disposed above the supply unit, and being pivotably supported around an axis extending in the axial direction, at a position upstream of the conveyer in the conveyance direction; and a rotor rotatably supported around an axis extending in the axial direction, the rotor being positioned upstream of the conveyer in the conveyance direction, and positioned downstream, in the conveyance direction, of an upstream end portion, in the conveyance direction, of the tensioner, the rotor being positioned such that an upper end of the rotor and a nipped point where the medium is to be sandwiched between the pair of rollers are at a same height, the rotor being configured to contact the second surface of the medium, wherein the tensioner has a pivot shaft, a pivot member, and an urging member, the pivot shaft extending in the axial direction, the pivot member being rotatably supported around the pivot shaft, and having an outer peripheral surface configured to contact the second surface, the urging member urging the pivot member toward a side on which the medium is to be arranged, and the rotor is provided separately from the pivot shaft, and is positioned downstream of the pivot shaft in the conveyance direction, a first distance between a rotational center of the pivot shaft and a rotational center of the rotor is shorter than a second distance between a rotational center of a first roller of the pair of rollers and the rotational center of the rotor, the first roller being configured to contact the second surface of the medium.

* * * * *